April 21, 1959
C. S. SCHROEDER
2,883,015
INCHING CONTROL FOR TORQUE TRANSMISSION
Filed Oct. 22, 1956
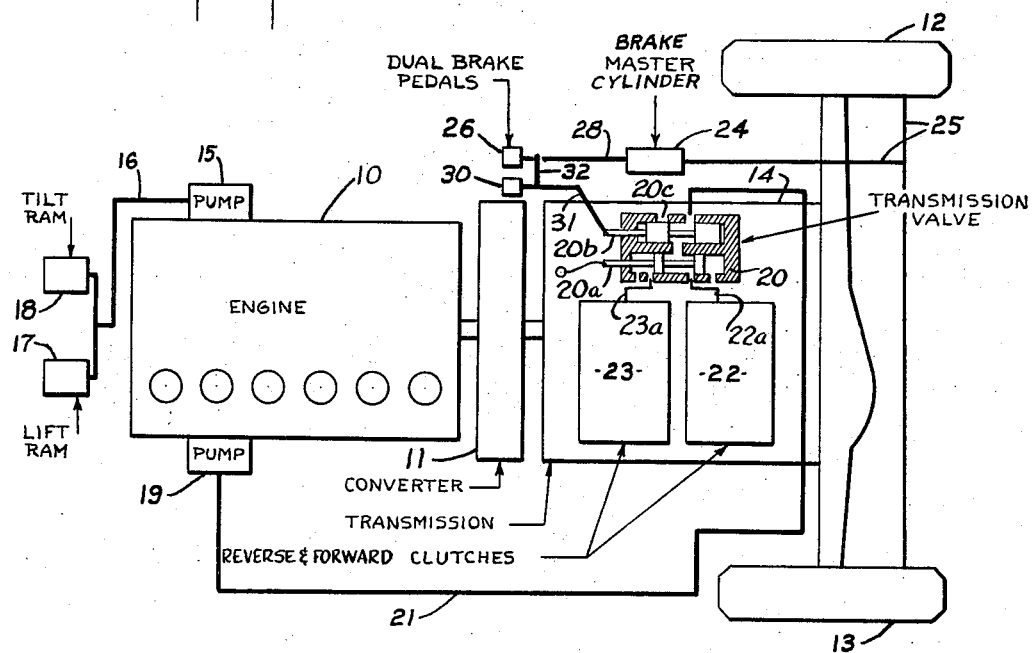
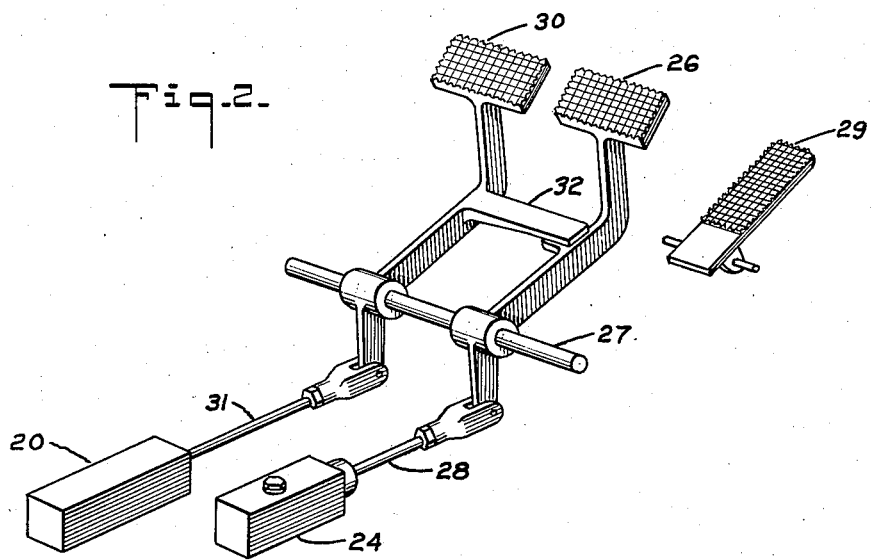
INVENTOR
C. S. Schroeder
BY
H. H. Golden
ATTORNEY

United States Patent Office 2,883,015
Patented Apr. 21, 1959

2,883,015

INCHING CONTROL FOR TORQUE TRANSMISSION

Charles S. Schroeder, Wynnewood, Pa., assignor to The Yale & Towne Manufacturing Company, Stamford, Conn., a corporation of Connecticut Application October 22, 1956, Serial No. 617,328

12 Claims. (Cl. 192—4)

This invention relates to industrial trucks of the type having hydraulic torque converter transmissions driven by a gas engine. In industrial trucks of the particular class the engine drives the impeller of the torque drive as well as a pump for a hydraulic circuit in which are usually incorporated tilting and lifting rams for tilting, lifting and otherwise manipulating a load. A transmission valve pump is also driven by the engine for supplying fluid under pressure to a transmission control valve that in turn controls the operation of a forward and reverse clutch for the transmission. Thus, the engine drives the torque converter which in turn actuates the transmission to propel the truck forwardly or rearwardly depending upon which of the two clutches has been actuated. The two clutches are in turn actuated under the control of the operator through the transmission valve and utilizing the power contributed by the small transmission valve pump.

In a truck of the class described, when the operator moves the usual control lever into forward position the transmission valve actuates the forward clutch to place the transmission in forward drive. As the engine is accelerated the truck moves forwardly in accordance with the speed of the engine. If the operator wishes to go slowly the engine is driven at a very slow rate.

As was earlier indicated the engine drives a pump for supplying liquid under pressure to hoisting and tilting rams, and such other rams as may be required. Usually these rams are actuated only when the truck is standing still and in that event the operator will put the transmission into neutral position by de-energizing both clutches. The rotation of the engine will now operate the pumps for moving fluid to the hoist or tilt rams under the control of the operator. If it is desired to lift or tilt at high speed the engine will be driven at a similarly high speed as those skilled in the art fully appreciate.

It has been found in trucks of the particular class that frequently it is necessary to hoist or tilt at a high speed and yet inch the truck forwardly or rearwardly. This means that the engine must be driven at very high speed in order to obtain fast hoisting or tilting while at the same time the truck must be moved at practically no more than zero speed. To accomplish this control, the truck braking system is utilized. Thus, the truck has the usual brake pedal linked to a master brake cylinder. The master brake cylinder in turn is connected to the brake cylinders in the wheels. It is further connected to the transmission valve in such fashion that when the brake pedal is depressed to set the brakes, it simultaneously operates the transmission valve to decrease the pressure at the clutches. This means therefore that the clutch disks are slipped so that even though the engine is moving at a very high speed, little if any movement is imparted to the wheels. Therefore, the engine may be driven at high speed to operate the hoisting and tilting rams while at the same time the actuation of the brake effects slipping of the clutches so that the truck may be inched.

I have found that while the operation of this earlier construction is very effective, it has a considerable defect in that in normal operation of the truck the application of the brake releases the torque converter and engine from the transmission, so that in effect, the truck is in "free wheeling." Thus, let us consider that a truck of the class described is moving down a relatively steep ramp and that the operator wishes to slow down the movement of the truck. The moment he applies his brake he immediately declutches the traction wheels from the engine and the engine may not be utilized to hold back the movement of the truck. This is what is commonly known as "free wheeling." Those skilled in the art will fully appreciate that brakes operating under these circumstances will wear rapidly. Further, in heavy trucks of the type used in industry, it is important that the engine braking power be retained.

My invention makes possible the inching of a truck of the class described while at the same time eliminating the "free wheeling" effect that is so very undesirable. Further, my invention accomplishes the general results indicated through means of great simplicity.

Under my concept, the usual brake pedal is utilized to operate nothing more than the master brake cylinder which in turn is connected only to the brake cylinders at the wheels. Therefore, when the brake pedal is depressed, the brakes are applied and there is nothing to prevent the utilization of the engine to assist in the braking of the truck. I have a second pedal or control that is connected to the transmission valve to effect the withdrawal of the pressure from the clutches whereby to permit inching, this second pedal or control being adapted further to actuate the master brake cylinder and through it the brake cylinders in the truck wheels. Preferably, this may be accomplished merely by the provision of means on the second pedal for operating the usual brake pedal at the same time that the transmission valve is actuated.

Therefore, I provide, in effect, two brake pedals. One brake pedal merely applies the brakes to the truck and is used under ordinary driving conditions. The other brake pedal not only applies the brakes of the truck, but also actuates the transmission valve to slip the clutches so that the truck may be inched at the same time that the engine is driven at high speed to effect high speed hoisting and tilting.

I have thus outlined rather broadly the more important features of my invention in order that the detailed description thereof that follows may be better understood, and in order that my contribution to the art may be better appreciated. There are, of course, additional features of my invention that will be described hereinafter and which will form the subject of the claims appended hereto. Those skilled in the art will appreciate that the conception on which my disclosure is based may readily be utilized as a basis for the designing of other structures for carrying out the several purposes of my invention. It is important, therefore, that the claims be regarded as including such equivalent constructions as do not depart from the spirit and scope of my invention, in order to prevent the appropriation of my invention by those skilled in the art.

In the drawing:

Fig. 1 shows diagrammatically the driving and braking system of a truck utilizing my novel control.

Fig. 2 shows in further detail parts of my control.

Referring now more particularly to Fig. 1 of the drawings, I indicate by the numeral 10 the internal combustion engine that is utilized in trucks of the particular class, that engine driving a torque converter 11 that acts in turn through a transmission 14 to drive the truck wheels 12, 13. The engine 10 drives also a pump 15 that supplies fluid pressure through a hydraulic line 16 for operating the usual load manipulating devices with which trucks of this class are equipped. As examples, I indicate in Fig. 1 a lift ram 17 and a tilt ram 18 that are operated by the pressure supplied through line 16. Those skilled in the art understand that the rams 17, 18 are under the control of the truck operator and that the speed of movement of rams 17, 18 will be generally proportional to the speed of the engine 10.

As is usual in trucks of the particular class, the engine 10 drives also a pump 19 that develops fluid pressure for controlling the truck transmission 14, that pressure being directed through a line 21 to a transmission valve 20. The transmission 14 has a forward drive clutch 22 and a rearward drive clutch 23, and the valve 20 can direct the fluid pressure from line 21 to effect driving engagement of either clutch 22 or 23. Valve 20 does that through a usual construction including a directional valve member 20a that normally controls the fluid pressure, and that is manually shifted to direct the pressure either through a line 22a to clutch 22, or through line 23a to clutch 23. Thus, through valve 20 the truck driver can actuate the forward clutch 22, so that the engine 10 when accelerated will drive the truck forwardly. By shifting valve member 20a, the driver can actuate clutch 23 for rearward drive. In circumstances that I shall presently describe, a pressure relief valve 20b on valve 20 will act in a usual way to remove fluid pressure from directional valve 20a. Thus, valve 20b when shifting toward the left, as viewed in Fig. 1, will gradually close the pressure supply line 21 and open a relief port 20c, so that the pressure no longer will be effective to hold either clutch 22, 23 engaged.

The truck is equipped also with a hydraulic braking system including a master brake cylinder 24 that acts through hydraulic lines 25 to apply the brakes of wheels 12, 13 in the usual way. As was earlier set forth, the truck engine 10 must drive the pump 15 at a rapid rate when it is desired to move either or both of the rams 17, 18 at high speed to manipulate a load. At this point it will be well to indicate that all the structure thus far described by me is well known in the art, and that the diagrammatic showing in the drawings is therefore quite adequate.

While driving the pump 15 at a rapid rate to move the load swiftly, it is often necessary that the engine 10 move the truck merely a small amount, or "inch" the truck, in order to handle the load properly. This is accomplished in the earlier trucks of the particular class by connecting the master brake cylinder to the pressure relief valve to effect slippage of the clutch that is engaged, when the brakes are applied through the master brake cylinder. Naturally, as I have already outlined, this release of the clutches in the earlier constructions will put the truck in "free wheeling" when the truck driver makes a service application of the brakes, as when moving down a steep ramp, since the clutches will not then be engaged. The driver can not therefore utilize the braking effect of the engine in the earlier trucks of the particular class. This results in fast wear of the brakes, and may even be dangerous.

Through the extremely novel control that I have conceived, I am able to retain the full braking effect of the engine when the brakes are applied, yet am able to "inch" the truck when that is necessary to facilitate handling of the load.

In my novel construction, I utilize a brake treadle 26 that is in conventional direct operating relation to the master brake cylinder 24. For the particular purpose, I prefer to mount the treadle 26 to rotate on a pivot shaft 27, Fig. 2, with a part of that treadle 26 connected suitably to the piston 28 of master cylinder 24. The accelerator pedal of the truck is shown at 29 in Fig. 2. It is important to observe at this point that the brake treadle 26 in my invention is at all times in control of the brakes, and is separate from the transmission valve 20 whereby to have no effect upon the truck drive.

I utilize a second brake treadle 30 that I prefer to mount on the pivot shaft 27 to the left of the first treadle 26, as shown in Fig. 2. The second treadle 30 I arrange to actuate pressure relief valve 20b on the transmission valve 20, while also applying the brakes to the wheels 12, 13. Thus treadle 30 operates a suitable linkage indicated diagrammatically at 31 and positioned between treadle 30 and pressure relief valve 20b. The arrangement is such that the second treadle 30 when depressed will act through the transmission valve 20 to relieve somewhat the pressure on either clutch 22 or 23, depending upon which clutch is then in driving position. The control of valve 20b is conventional and may be accomplished through treadle 30 in accordance with prior art practices. The second treadle 30 will also actuate the brakes at wheels 12, 13 through use of an arm 32 fixed to treadle 30 and extending over a part of the first treadle 26, all as shown in Fig. 2.

To appreciate my novel control to the fullest extent, it should be realized that the treadle 30 when depressed will gradually increase the braking pressure that is applied to the wheels 12, 13 through the master cylinder 24, while gradually relieving pressure upon one of the clutches 22, 23 to permit slippage. This is the action found in prior art trucks in which only one brake treadle is found. Through that action, the truck driver can accelerate the engine 10 to any desired extent through the accelerator 29 whereby to move the lift ram 17 or tilt ram 18 at high speed, but with the truck "inched" as may be desired because of the relieved pressure at the clutches accompanied by the application of the brakes. Despite the fact that it is possible for the truck driver to achieve this very desirable inching control, the driver nevertheless will have available the full braking effect of the engine 10 when he wishes to apply the brakes during normal truck movement. This is possible in my invention because the operator, by utilizing the first brake pedal 26, can actuate the brakes without effecting slippage or release of the clutches 22, 23. It is well to emphasize that my novel control is possible even though I use but one braking system in my truck.

It will be seen, therefore, that through my novel concept I am able to achieve inching of the truck without sacrificing the braking effect of the engine during normal movements of the truck. Since I thereby avoid free wheeling of the truck, I am able to reduce to a considerable extent the wear to which the brakes are subjected, and also to operate the truck somewhat more safely. All of these things I accomplish through means that actually are rather simple. I believe, therefore, that those skilled in the art will appreciate the very considerable value of the novel inching control that I contribute by my invention.

I now claim:

1. In a truck of the class described, a hydraulic torque converter, an engine, a transmission including forward and reverse clutches, a control valve through which said clutches are actuated and controlled by hydraulic pressure, a master brake cylinder for controlling the hydraulic brakes of the truck, a brake treadle for said master cylinder, a second treadle, means whereby the actuation of said second treadle operates said control valve to reduce the pressure actuating either of the clutches, and additional means whereby the actuation of said second treadle applies the brakes of said truck through said master brake cylinder.

2. In a truck of the class described, a hydraulic torque converter, an engine for driving said torque converter, a transmission including forward and reverse clutches, a control valve through which said clutches are actuated and controlled by hydraulic pressure, a master brake cylinder for controlling the hydraulic brakes of the truck, a brake treadle for said master cylinder, a second treadle, means whereby the actuation of said second treadle operates said control valve to reduce the pressure actuating either of the clutches so that said truck may be inched in either forward or reverse, and additional means whereby said second treadle also actuates the master cylinder to effect actuation of the brakes of said truck.

3. In a truck of the class having a hydraulic torque converter, an engine, a transmission including forward and reverse clutches, a control valve through which said clutches are actuated by hydraulic pressure, a brake system for controlling the brakes of the truck, a pair of brake treadles, means whereby either of said treadles operates a part of the brake system to apply the brakes of the truck, and means whereby the actuation of one of said treadles also operates said control valve to reduce the pressure actuating either of the clutches to permit inching through the slipping of the clutches.

4. In a truck of the class having a hydraulic torque converter, an engine, a transmission including forward and reverse clutches, a control valve through which said clutches are actuated by hydraulic pressure, a master brake cylinder for controlling the hydraulic brakes of the truck, a brake treadle for said master cylinder, a second treadle, means whereby the actuation of said second treadle operates said control valve to reduce the pressure actuating either of the clutches, and a part fixed to said second treadle for actuating the first treadle to apply the brakes of said truck through said master brake cylinder.

5. In a truck of the class having a hydraulic torque converter, an engine driving said converter, a transmission driven by said converter and including forward and reverse clutches, a control valve through which said clutches are actuated by hydraulic pressure, a master brake cylinder for controlling the hydraulic brakes of the truck, a brake treadle for said master cylinder, a second treadle, means whereby the actuation of said second treadle operates said control valve to reduce the pressure actuating either of the clutches, and means on said second treadle for depressing said brake treadle when said second treadle actuates said control valve.

6. In a truck of the class having a hydraulic torque converter, an engine driving said converter, a transmission driven by said converter and including forward and reverse clutches, a control valve through which said clutches are actuated by hydraulic pressure, a master brake cylinder for controlling the hydraulic brakes of the truck, a brake treadle for said master cylinder, a second treadle also adapted to actuate said master cylinder to effect application of the brakes, and means whereby said second treadle when applying said brakes actuates said control valve to reduce the pressure actuating said clutches.

7. In a truck of the class described, a hydraulic torque converter, an engine driving said converter, an accelerator pedal for controlling said engine, a transmission through which said converter drives the truck wheels, said transmission including forward and reverse drive clutches, a control valve for applying fluid pressure to engage either clutch to enable the engine to drive the truck in either direction, a master brake cylinder, a brake treadle for actuating said master cylinder to control hydraulic brakes on the truck, said brake treadle enabling the brakes to be applied while a clutch is engaged so that the braking effect of the engine can be utilized together with the brakes for braking the truck, a second treadle also adapted to actuate said master cylinder to effect application of the brakes, and means through which the second treadle when effecting application of the brakes actuates said control valve to reduce the pressure effecting engagement of said clutches so that the truck driver by utilizing together the accelerator pedal and said second treadle can effect inching of the truck.

8. In a truck of the class described, a hydraulic torque converter, an engine, a transmission including forward and reverse clutches, a control valve through which said clutches are actuated and controlled by hydraulic pressure, a master brake cylinder for controlling the hydraulic brakes of the truck, a brake treadle for said master cylinder, means whereby the application of the brakes through actuation of said brake treadle actuates said control valve to effect reduction of the pressure actuating either of the clutches so that the truck may be inched, and means effective to actuate said master cylinder independently of said brake treadle whereby to apply the brakes without reducing the clutch actuating pressure.

9. In a truck of the class described, a hydraulic torque converter, an engine for driving said converter, a transmission including forward and reverse clutches, a control valve through which said clutches are controlled and actuated by hydraulic pressure, a master brake cylinder for controlling the hydraulic brakes of the truck, a brake treadle for said master cylinder, means whereby actuation of said brake treadle to effect application of the brakes actuates said control valve to effect the reduction of the pressure actuating either of the clutches so that the clutches may be slipped and the truck may be inched while the engine rotates at high speed, and additional means for operating said master cylinder to effect application of said brakes independently of said brake treadle.

10. In a truck of the class described, a hydraulic torque converter, an engine, a transmission including forward and reverse clutches, a control valve through which each clutch is actuated and controlled by hydraulic pressure, a master brake cylinder for controlling hydraulic brakes on the truck, a first treadle connected with said master brake cylinder, a second treadle connected with said control valve to effect slipping of said clutches, means mounting said first treadle for movement relatively to the second treadle whereby to control the brakes independently of the clutch actuation, and means whereby said second treadle when operating said control valve to slip a selective one of said clutches also actuates the brakes for said truck so that the truck may be inched in a forward or reverse direction.

11. In a truck of the class described, a hydraulic torque converter, an engine, a transmission including forward and reverse clutches, a control valve through which each clutch is actuated and controlled by hydraulic pressure to effect slipping of the clutch, a master brake cylinder for controlling hydraulic brakes on the truck, a first treadle connected with said master brake cylinder, a second treadle connected with said control valve to effect slipping of said clutches, means mounting said first treadle for movement independently of the second treadle so that said first treadle when moving to apply the brakes does not declutch the engine, and means whereby said second treadle when operating said control valve to slip a selective one of said clutches also actuates the brakes for said truck so that the truck may be inched while the engine rotates at high speed.

12. In a truck of the class described, a hydraulic torque converter, an engine for driving said torque converter, a transmission including forward and reverse clutches through either of which the converter drives the truck, a control valve through which said clutches are actuated and controlled by hydraulic pressure, a master brake cylinder for controlling hydraulic brakes on the truck, said control valve when actuated effecting a reduction of the pressure actuating either of the clutches, a treadle for actuating the master cylinder to effect application of the brakes without actuating the control valve whereby to enable the braking effect of the engine to be utilized while the brakes are applied, a second treadle for actuating said control valve to effect reduction of the pressure actuating said clutches, and means through which said second treadle when actuating the control valve to reduce the pressure actuating either clutch acts also to effect application of the truck brakes so that the truck may be inched while the engine rotates at high speed.

References Cited in the file of this patent

UNITED STATES PATENTS

| | | |
|---|---|---|
| 1,820,359 | Manning | Aug. 25, 1931 |
| 2,280,157 | Mead | Apr. 21, 1942 |
| 2,786,368 | Cook | Mar. 26, 1957 |